US 8,422,665 B2

(12) United States Patent
Chen et al.

(10) Patent No.: US 8,422,665 B2
(45) Date of Patent: Apr. 16, 2013

(54) TELEPHONE DEVICE FOR DETECTING STATUS OF A HANDSET WITH LIGHT DETECTION

(75) Inventors: I-Ming Chen, New Taipei (TW); Kun-Liang Lai, New Taipei (TW); Yi-Hung Chen, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 96 days.

(21) Appl. No.: 13/237,978

(22) Filed: Sep. 21, 2011

(65) Prior Publication Data
US 2012/0093307 A1    Apr. 19, 2012

(30) Foreign Application Priority Data
Oct. 13, 2010  (TW) ................................ 99219727 U

(51) Int. Cl.
*H04M 1/00*    (2006.01)
*H04M 9/00*    (2006.01)
(52) U.S. Cl.
USPC ..................... 379/428.02; 379/422; 379/424
(58) Field of Classification Search .................. 379/419, 379/422, 423, 424, 425, 428.01, 428.02, 379/447
See application file for complete search history.

(56) References Cited

U.S. PATENT DOCUMENTS

| | | | | |
|---|---|---|---|---|
| 4,079,201 A | * | 3/1978 | Scott et al. | 379/131 |
| 5,835,585 A | * | 11/1998 | Morse | 379/424 |
| 5,953,656 A | * | 9/1999 | Bertocci | 455/412.2 |
| 2010/0290616 A1 | * | 11/2010 | Chou | 379/419 |

FOREIGN PATENT DOCUMENTS

CN    201499191    6/2010

* cited by examiner

*Primary Examiner* — Tuan D Nguyen
(74) *Attorney, Agent, or Firm* — Winston Hsu; Scott Margo

(57) ABSTRACT

A telephone device includes a base, a light transmitter, a light penetrating element for penetrating light transmitter from the light transmitter, and a handset. When an end of the handset is on-hook with the base, the end of the handset reflects the light emitted from the light transmitter and penetrating through the light penetrating element back to the light penetrating element. The telephone device further includes a light receiver for receiving the light reflected from the handset when the end of the handset is on-hook with the base, a light concentrating element for concentrating the light emitted from the light transmitter to the light penetrating element, and a control unit for determining whether the end of the handset is on-hook with the base according to whether the light receiver receives the light reflected from the handset.

9 Claims, 5 Drawing Sheets

TELEPHONE DEVICE FOR DETECTING STATUS OF A HANDSET WITH LIGHT DETECTION

BACKGROUND OF THE INVENTION

1. Field of the Invention

The present invention relates to a telephone device, and more particularly, to a telephone device for detecting status of a handset with light detection.

2. Description of the Prior Art

In order to ensure whether a handset is on-hook, a conventional telephone device utilizes a link mechanism connected to an end of a bar, and another end of the bar is connected to a conductive component. When the telephone device is on-hook, the telephone device touches the link mechanism and drives the bar and the conductive component to contact the circuit board, so as to perform switching between open circuit and short circuit. Accordingly, it can detect status of the handset. However, such kind of the link mechanism accumulates dusts, and a spring installed in the link mechanism easily fatigues, or causes a condition of stuck, so as to affect accuracy of the link mechanism. In order to solve above drawbacks, a mechanism of detecting an infrared signal to determine whether a telephone device is on-hook is disclosed in China Patent No. CN 200920303068. However, it uses a plurality of reflecting sets, and determines whether a handset is picked up or on-hook according to whether an infrared receiver receives the infrared signal reflected by the plurality of reflecting sets. Accordingly, as for design of optical path, when positions of the reflecting sets dislocate slightly or an emitting angle of the infrared deviates, it causes error judgment of the status of the handset. The telephone device has important issues on determining mechanism to determine whether the handset is on-hook without complicated mechanical design.

SUMMARY OF THE INVENTION

The present invention provides a telephone device for detecting status of a handset with light detection for solving above drawbacks.

According to the claimed invention, a telephone device for detecting status of a handset with light detection includes a base including a housing. A slot is formed on the housing. The telephone device further includes a light transmitter installed in the housing of the base for emitting light, a light penetrating element installed on the housing and disposed on a side of the slot for penetrating light emitted from the light transmitter, and a handset hooked on the base in a detachable manner. An end of the handset reflects the light emitted from the light transmitter and penetrating through the light penetrating element back to the light penetrating element when an end of the handset is on-hook with the slot of the housing. The telephone device further includes a light receiver installed in the housing of the base for receiving the light reflected from the end of the handset and penetrating from the light transmitter when the end of the handset is on-hook with the slot of the housing, and a light concentrating element installed in the housing of the base and surrounding the light transmitter. A first opening is formed on the light concentrating element, and the light concentrating element is used for concentrating the light emitted from the light transmitter to the light penetrating element via the first opening. The telephone device further includes a control unit coupled to the light receiver for determining whether the end of the handset is on-hook with the slot of the housing according to whether the light receiver receives the light.

According to the claimed invention, the light transmitter is an infrared ray light emitting diode, and the light receiver is an infrared ray receiver.

According to the claimed invention, the light penetrating element is an infrared lens.

According to the claimed invention, the light concentrating element includes a vertical wall for constraining the light emitted from the light transmitter to vertically travel to the light penetrating element.

According to the claimed invention, the vertical wall contacts against a side of the light penetrating element.

According to the claimed invention, the light concentrating element further surrounds the light receiver, a second opening is further formed on the light concentrating element, and the light concentrating element is further used for concentrating the light from the light penetrating element to the light receiver via the second opening.

According to the claimed invention, the light concentrating element is made of rubber material.

According to the claimed invention, the control unit is further coupled to the light transmitter and for controlling on/off status of the light transmitter.

According to the claimed invention, the telephone device is a network telephone.

The present invention determines whether the telephone device is picked up or on-hook according to whether the light receiver receives the light reflected from the handset. The present invention is capable of accurately determining statuses of the telephone device without complicated mechanism and optical path. Furthermore, no hole is formed on appearance of the telephone device since there is no link mechanism. Accordingly, it can keep preferred aesthetic feeling of appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
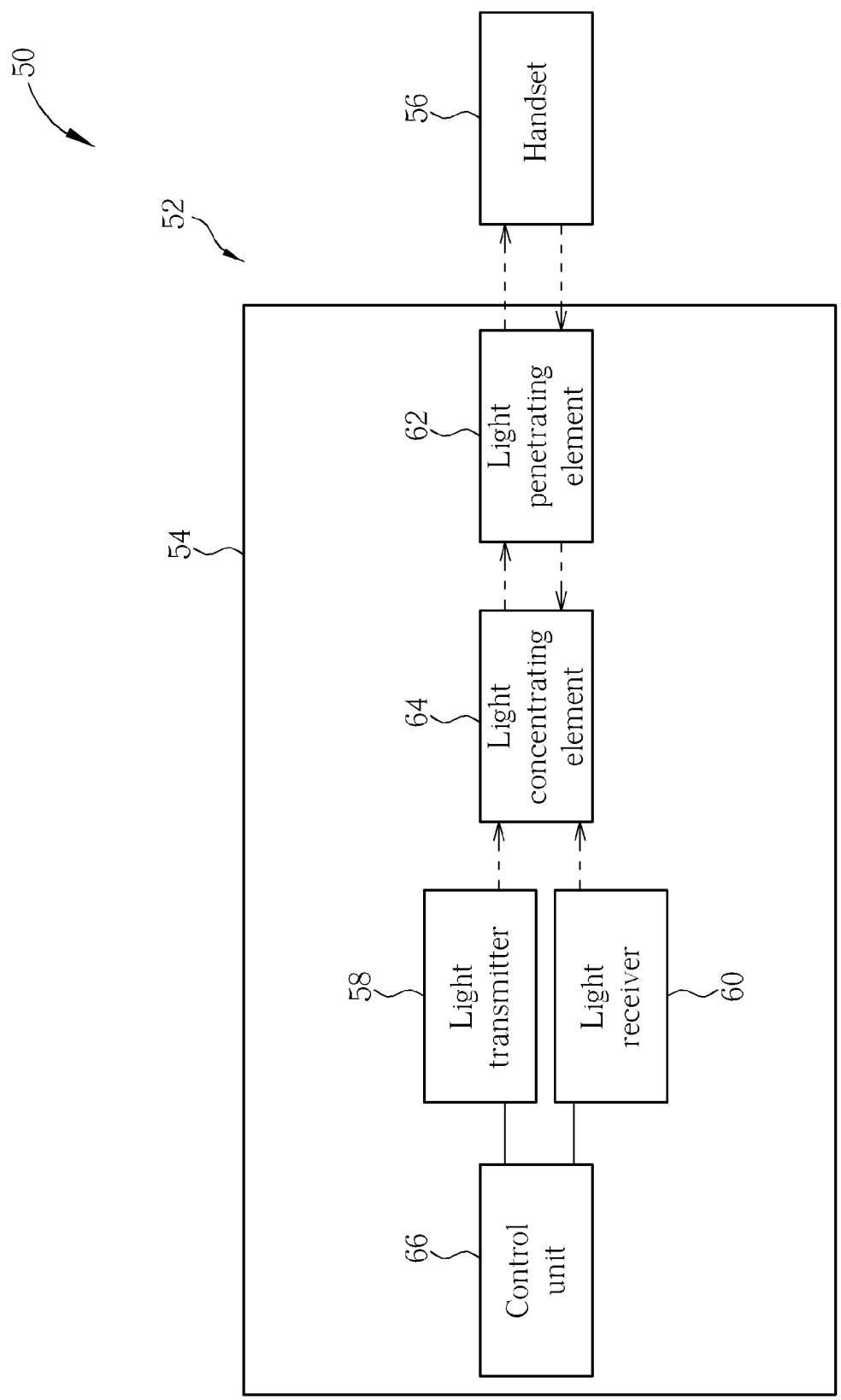
FIG. 1 and FIG. 2 are respectively a functional block diagram and a schematic diagram of a telephone device according to a preferred embodiment of the present invention.
Figure 2:
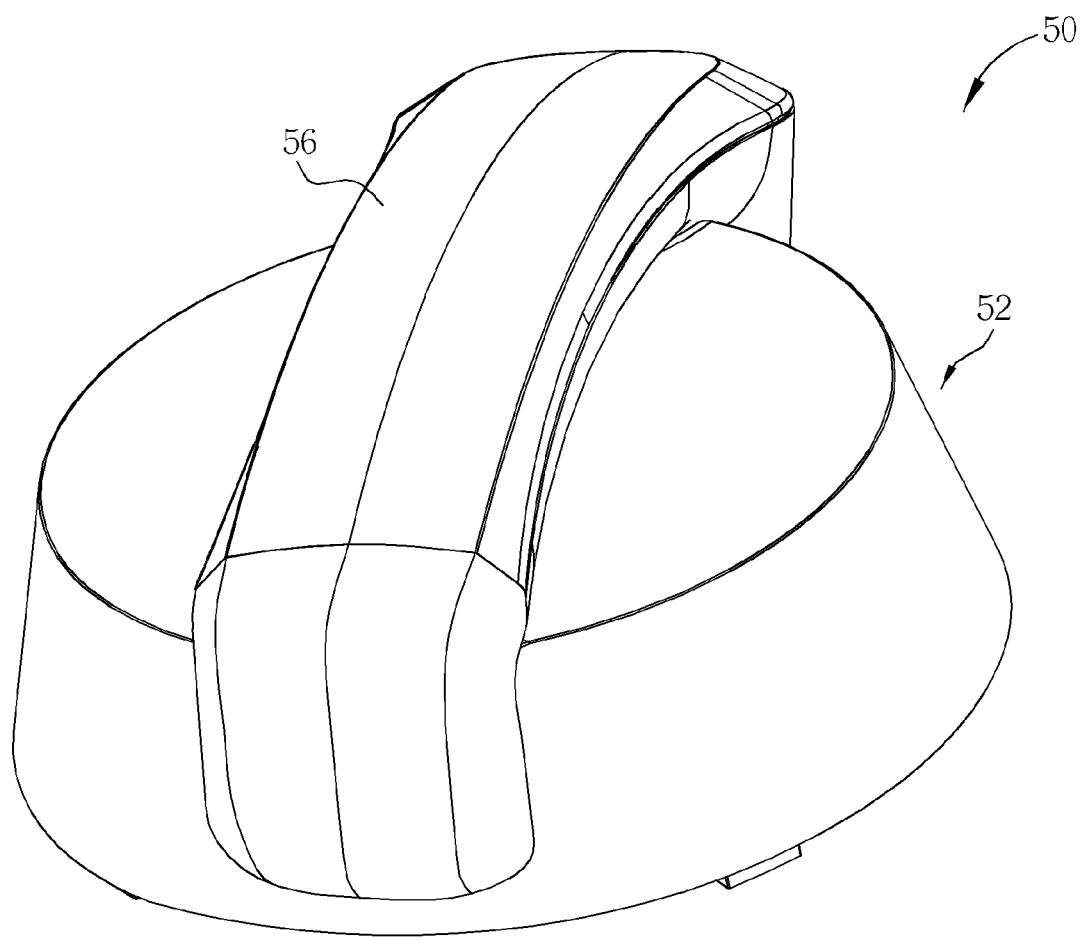

Please refer to FIG. 1 and FIG. 2. FIG. 1 and FIG. 2 are respectively a functional block diagram and a schematic diagram of a telephone device 50 according to a preferred embodiment of the present invention. The telephone device 50 can be a desktop network telephone. The telephone device 50 includes a base 52 including a housing 54. The telephone device 50 further includes a handset 56 hooked on the base 52 in a detachable manner. When the handset 56 is hooked on the base 52, the telephone device 50 is in a status capable of receiving an incoming call. When the handset 56 is separate from the base 52, the telephone device 50 is in an online status.

Figure 3:
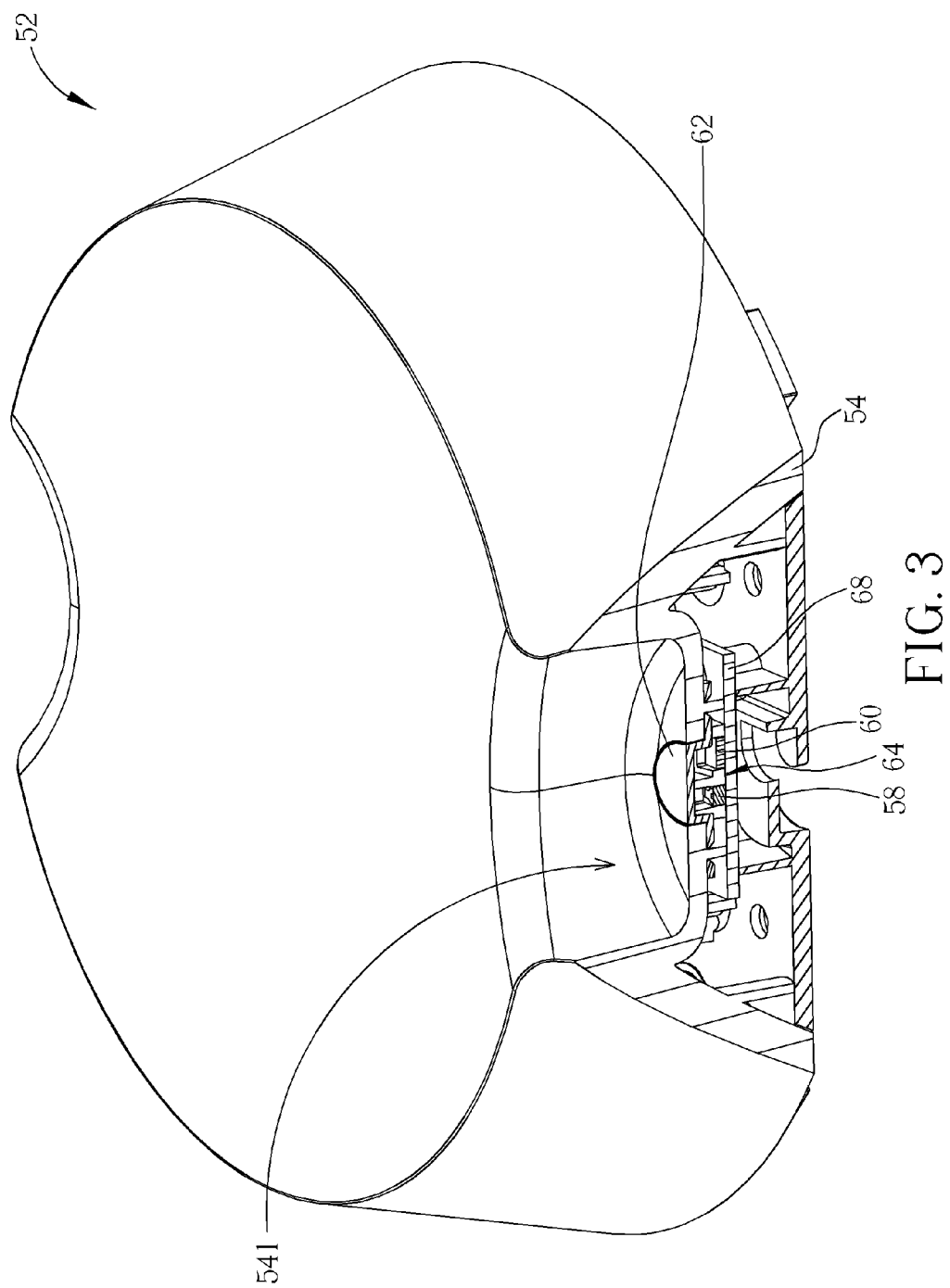
FIG. 3 is a sectional view of a base according to the preferred embodiment of the present invention.

Please refer to FIG. 1 to FIG. 3. FIG. 3 is a sectional view of the base 52 according to the preferred embodiment of the present invention. The telephone device 50 further includes a light transmitter 58 installed in the housing 54 of the base 52 for emitting light. For example, the light transmitter 58 can be an infrared light emitting diode for emitting infrared rays. The telephone device 50 further includes a light receiver 60 installed in the housing 54 of the base 52 for receiving the light. The light transmitter 58 is capable of receiving light with the same wavelength as that emitted from the light receiver 60. For example, when the light transmitter 58 is an infrared light emitting diode, the light receiver 60 is an infrared receiver correspondingly. The telephone device 50 further includes a light penetrating element 62 installed on the housing 54 of the base 52 and disposed on a side of a slot 541 on the housing 54. The light penetrating element 62 is used for penetrating the light with the same wavelength as that emitted from the light transmitter 58, such as for penetrating the light with the same wavelength as that of the infrared. In other words, the light penetrating element 62 can be made of transparent material. For example, the light penetrating element 62 can be an infrared lens. The telephone device 50 further includes a light concentrating element 64 installed in the housing 54 of the base 52 and surrounding the light transmitter 58 and the light receiver 60. The light concentrating element 64 is used for concentrating the light emitted from the light transmitter 58 to the light penetrating element 62, and is used for concentrating the light reflected by the handset 56 and penetrating through the light penetrating element 62 to the light receiver 60. The light concentrating element 64 can be made of flexible material, such as rubber. The telephone device 50 further includes a control unit 66 coupled to the light transmitter 58 and the light receiver 60. The control unit 66 is used for determining whether the end of the handset 56 is on-hook with the slot 541 of the housing 54 according to whether the light receiver 60 receives the light. In addition, the telephone device 50 further includes a circuit board 68 installed inside the housing 54 of the base 52 for supporting the light transmitter 58, the light receiver 60, the light concentrating element 64, and so on. For example, the light concentrating element 64 can be attached on the circuit board 68 by glue.

Figure 4:
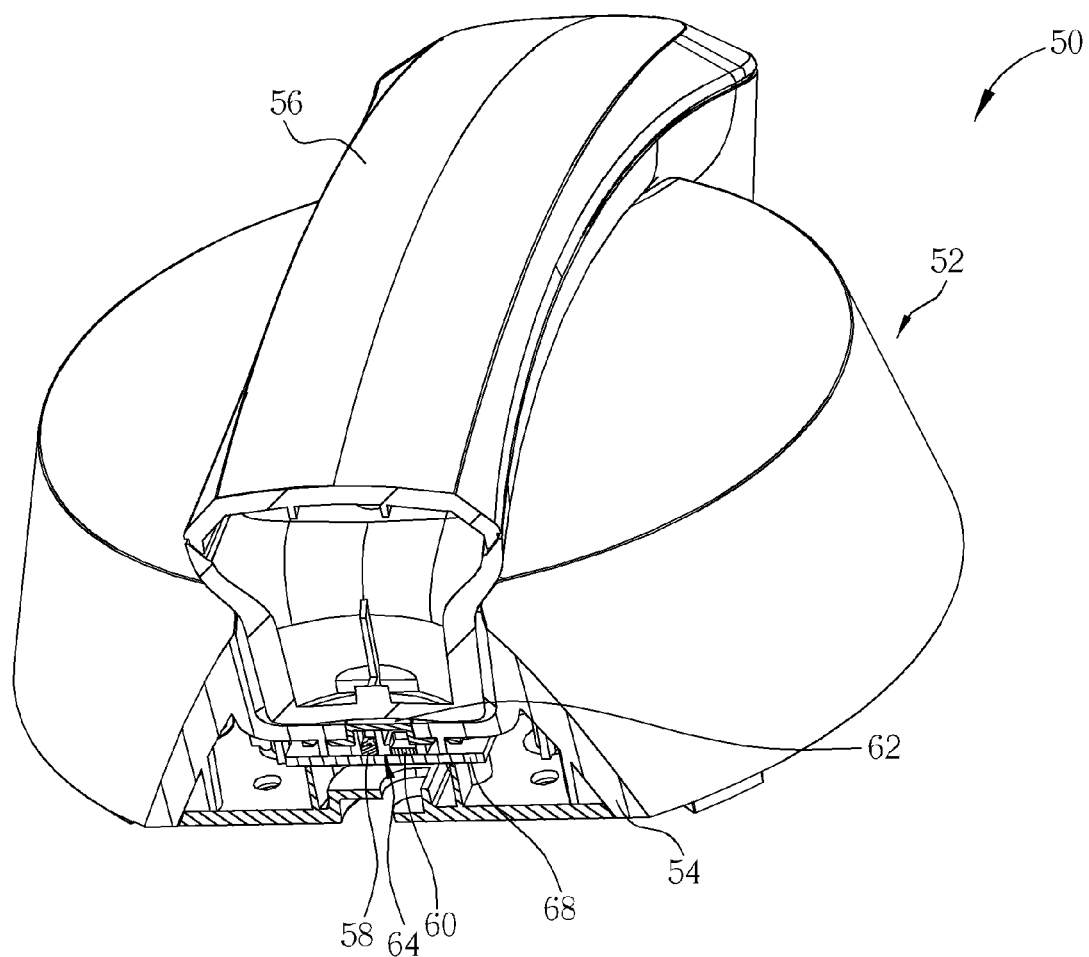
FIG. 4 is a sectional view of a handset hooked on the base according to the preferred embodiment of the present invention.
Figure 5:
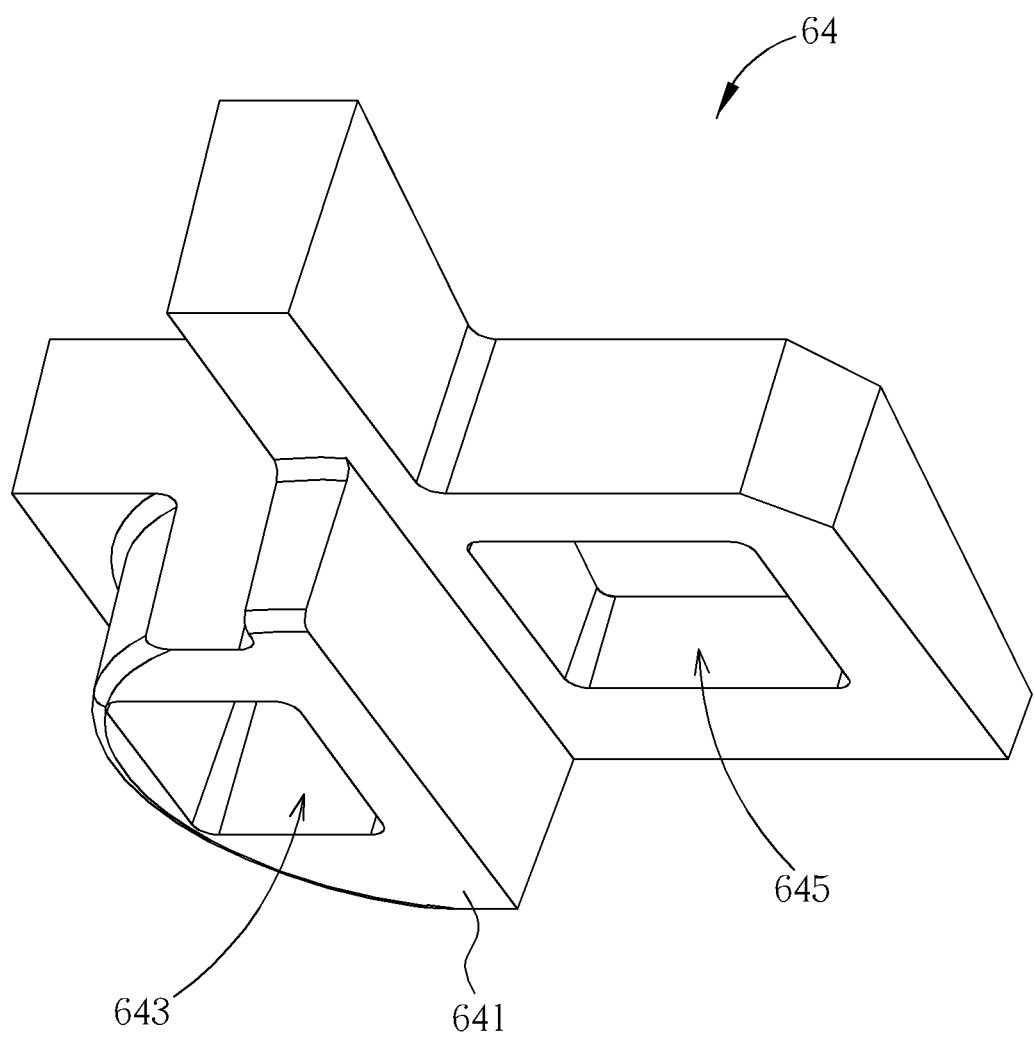
FIG. 5 is a diagram of a light concentrating element according to the preferred embodiment of the present invention.

Please refer to FIG. 1 to FIG. 5. FIG. 4 is a sectional view of the handset 56 hooked on the base 52 according to the preferred embodiment of the present invention. FIG. 5 is a diagram of the light concentrating element 64 according to the preferred embodiment of the present invention. The light concentrating element 64 includes a vertical wall 641 for constraining the light emitted from the light transmitter 58 to vertically travel to the light penetrating element 62. Since the light concentrating component 64 can be made of flexible material and an upper portion of the vertical wall 641 contacts against a side of the light penetrating element 62, the light concentrating component 64 can be stably fixed between an inner side of the housing 54 and the circuit board 68 so as to enclose the light transmitter 58, so that the light emitted from the light transmitter 58 can be directly guided to the light penetrating element 62 without diverging. In such a manner, the light receiver 60 can avoid determining error due to receiving the diverging light emitted from the light transmitter 58. A first opening 643 and a second opening 645 are formed on the light concentrating element 64, wherein the first opening 643 and the second opening 645 are respectively disposed at positions corresponding to the light transmitter 58 and the light receiver 60. In such a manner, the light concentrating element 64 is capable of concentrating the light emitted from the light transmitter 58 to the light penetrating element 62 via the first opening 643, and is used for concentrating the light reflected by the handset 56 and penetrating through the light penetrating element 62 to the light receiver 60 via the second opening 645. In addition, the present invention provides a design that the light concentrating element 64 only surrounds the light transmitter 58 as well. In other words, the light concentrating element 64 is only for concentrating the light emitted from the light transmitter 58 to the light penetrating element 62. The aforementioned design depends on practical demands.

More detailed description of the telephone device 50 to detect statuses of the handset 56 with light detection is introduced as follows. When the handset 56 is hooked on the base 52 and an end of the handset 56 is disposed in the slot 541 of the housing 54, the end of the handset 56 is located above the light penetrating element 62 and covers the light penetrating element 62. Since the light emitted from the light transmitter 58 is concentrated by the vertical wall 641 of the light concentrating element 64 to be directly transmitted to the light penetrating element 62 via the first opening 643, and the light emitted from the light transmitter 58 is allowed to penetrate the light penetrating element 62, the end of the handset 56 reflects the light emitted from the light transmitter 58 and penetrating through the light penetrating element 62 back to the light penetrating element 62. The light reflected by the end of the handset 56 penetrates the light penetrating element 62 again, and the light is transmitted to the light receiver 60 by concentration of the light concentrating element 64 via the second opening 645. In such a manner, the light receiver 60 is capable of receiving the light emitted from the light transmitter 58. After the light receiver 60 receives the light emitted from the light transmitter 58, the light receiver 60 will output a corresponding signal to the control unit 66. In such a manner, the control unit 66 is capable of determining that the end of the handset 56 is hooked in the slot 541 of the housing 54 so as to perform corresponding operation, such as displaying a corresponding light or being in the status capable of receiving an incoming call, and so on.

On the contrary, when the handset 56 is not hooked on the base 52 and the end of the handset 56 is not disposed in the slot 541 of the housing 54, the end of the handset 56 is incapable of covering the light penetrating element 62. In such a manner, since the light emitted from the light transmitter 58 and penetrating the light penetrating element 62 will penetrate upwards without being blocked, the light receiver 60 is incapable of receiving the light emitted from the light transmitter 58. Accordingly, the control unit 66 is capable of determining that the end of the handset 56 is unhooked in the slot 541 of the housing 54 so as to perform corresponding operation, such as displaying a corresponding light or being in the online status, and so on. In addition, in order to enhance accuracy of determination of the telephone device 50, a current flowing into the light transmitter 58 can be controlled to adjust a light emitting distance of the light transmitter 58. In other words, the light emitting distance of the light transmitter 58 can be controlled to be smaller than or approximately equal to a height of the slot 541. In such a manner, the handset 56 is only capable of blocking the light when the handset 56 is hooked and disposed in the slot 541, and the light emitted from the light transmitter 58 is not blocked when a user puts his hand above the base 52, so as to avoid determining error. Furthermore, in order to reduce power consumption and to enhance service life of the light transmitter 58, the control unit 66 can be used for controlling on/off status of the light transmitter 58 for avoiding the light transmitter 58 from continuously being turned on. The aforementioned design depends on practical demands.

In contrast to the prior art, the present invention determines whether the telephone device is picked up or on-hook according to whether the light receiver receives the light reflected from the handset. The present invention is capable of accurately determining statuses of the telephone device without complicated mechanism and optical path design. Furthermore, no hole is formed on appearance of the telephone device since there is no link mechanism. Accordingly, it can keep aesthetic feeling of appearance. In summary, the present invention provides a telephone device with light detection with simple structure, accurate determination, and preferred aesthetic feeling of appearance.

Those skilled in the art will readily observe that numerous modifications and alterations of the device and method may be made while retaining the teachings of the invention.

What is claimed is:

1. A telephone device for detecting status of a handset with light detection, comprising:
    a base comprising a housing, a slot being formed on the housing;
    a light transmitter installed in the housing of the base for emitting light;
    a light penetrating element installed on the housing and disposed on a side of the slot for penetrating light emitted from the light transmitter;
    a handset hooked on the base in a detachable manner, an end of the handset reflecting the light emitted from the light transmitter and penetrating through the light penetrating element back to the light penetrating element;
    a light receiver installed in the housing of the base for receiving the light reflected from the end of the handset and penetrating from the light transmitter when the end of the handset is on-hook with the slot of the housing;
    a light concentrating element installed in the housing of the base and surrounding the light transmitter, a first opening being formed on the light concentrating element, and the light concentrating element being used for concentrating the light emitted from the light transmitter to the light penetrating element via the first opening; and
    a control unit coupled to the light receiver for determining whether the end of the handset is on-hook with the slot of the housing according to whether the light receiver receives the light.

2. The telephone device of claim 1, wherein the light transmitter is an infrared ray light emitting diode, and the light receiver is an infrared ray receiver.

3. The telephone device of claim 1, wherein the light penetrating element is an infrared lens.

4. The telephone device of claim 1, wherein the light concentrating element comprises a vertical wall for constraining the light emitted from the light transmitter to vertically travel to the light penetrating element.

5. The telephone device of claim 4, wherein the vertical wall contacts against a side of the light penetrating element.

6. The telephone device of claim 1, wherein the light concentrating element further surrounds the light receiver, a second opening is further formed on the light concentrating element, and the light concentrating element is further used for concentrating the light from the light penetrating element to the light receiver via the second opening.

7. The telephone device of claim 1, wherein the light concentrating element is made of rubber material.

8. The telephone device of claim 1, wherein the control unit is further coupled to the light transmitter and for controlling on/off status of the light transmitter.

9. The telephone device of claim 1, being a network telephone.

\* \* \* \* \*